No. 803,310. PATENTED OCT. 31, 1905.
J. T. SMITH.
NUT LOCK.
APPLICATION FILED MAY 20, 1905.
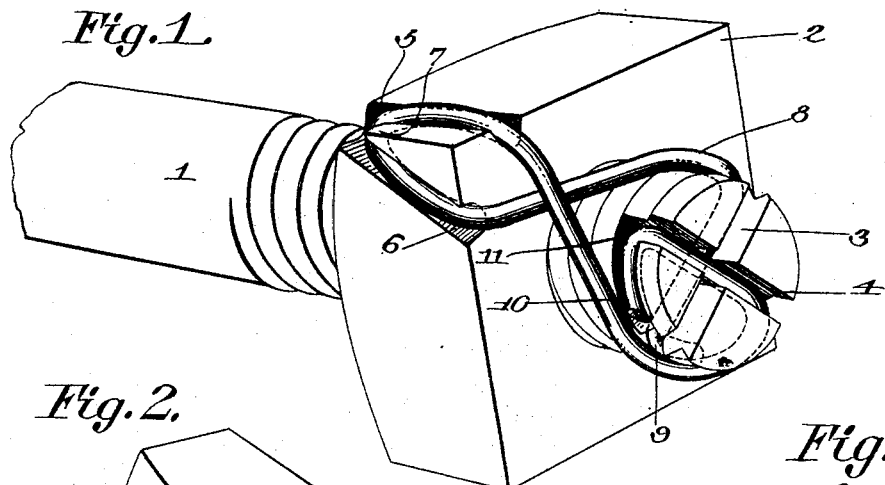
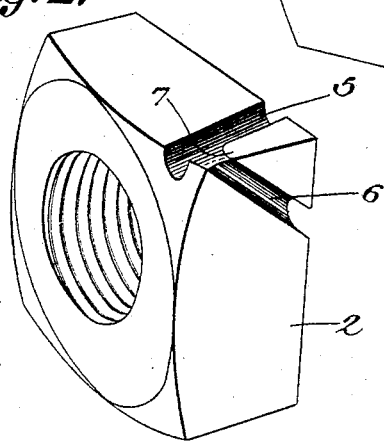
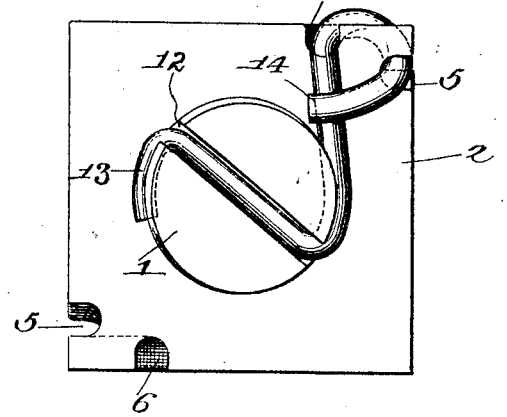
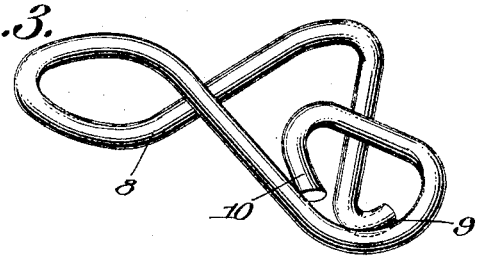
Witnesses:
Jacob T. Smith, Inventor,
by C. A. Snow & Co.
Attorneys.

UNITED STATES PATENT OFFICE.

JACOB T. SMITH, OF DUBLIN, VIRGINIA.

NUT-LOCK.

No. 803,310.　　　Specification of Letters Patent.　　　Patented Oct. 31, 1905.

Application filed May 20, 1905. Serial No. 261,318.

*To all whom it may concern:*

Be it known that I, JACOB T. SMITH, a citizen of the United States, residing at Dublin, in the county of Pulaski and State of Virginia, have invented a new and useful Nut-Lock, of which the following is a specification.

This invention relates to nut-locks.

The object of the invention is in a simple, thoroughly feasible, and positive manner to lock a nut upon a bolt against the possibility of accidental separation therefrom, and, further, to facilitate the separation of the nut from the bolt when necessary.

With the above and other objects in view, as will appear as the nature of the invention is better understood, the same consists in the novel construction and combination of parts of a nut-lock, as will be hereinafter fully described and claimed.

In the accompanying drawings, forming a part of this specification, and in which like characters of reference indicate corresponding parts, Figure 1 is a view in perspective of one form of the invention. Fig. 2 is a perspective detail view of the locking-nut. Fig. 3 is a perspective detail view of the locking member. Fig. 4 is a view in end elevation showing a slightly-modified form of the invention.

Referring to the drawings, 1 and 2 designate, respectively, a bolt and a nut, which may be of the usual or any preferred construction, and therefore need no detailed description.

The gist of the present invention resides in the manner in which the bolt and nut are altered to adapt them to receive the locking device by which the parts are held positively combined. The threaded portion of the bolt is provided with two channels or grooves 3 and 4, that are disposed at right angles to each other and may be of any preferred depth. These channels or grooves may be formed in the bolt at the time it is made or may be supplied by the person using it.

The nut 2, which may be of any polygonal form desired, is provided in the form of the invention shown in Fig. 2 at one corner with two channels or grooves 5 and 6, the channel 5 being disposed approximately at right angles to one edge of the nut and the channel 6 obliquely thereto on the adjacent edge of the nut and intersecting the channel 5, forming thereby a lug or teat 7, which by reason of the oblique disposition of the channel 6 will be undercut. While it will ordinarily only be necessary to provide but one of the corners with the lug or teat described, as shown in Fig. 4, diagonally opposite corners may be provided with such elements in order that the securing of the nut may be rendered more stable, if found necessary.

In securing the nut upon the bolt the former is first turned to its seat, as shown. A wire 8, which will preferably be malleable iron in order that it may readily bend, has one of its end portions seated in the groove 3 and its terminal bent around the exterior of the bolt between the threads thereof, as shown at 9. The wire is then passed down through the inclined channel 6, around the teat 7, up through the channel 5, and then partially around the bolt and into the thread thereof and thence passed through the channel 4, the remaining terminal of the wire being bent at right angles to its length and seated in the valleys of the threads, as shown at 10. By this means it will be seen that the nut will be positively locked upon the bolt against possibility of turning, and by reason of the fact that the terminals of the locking wire or element are sunk into the valleys between the threads it will be seen that accidental separation of these parts will positively be precluded. Ordinarily it will be preferred thus to dispose the terminals of the locking member; but this is not essential, as the wire may be extended through the channels and terminate with the crests of the threads, the intermediate portion of the wire, or that engaging the valleys, being positive in holding the locking member against accidental separation. Under ordinary conditions the locking member or wire will be of a diameter equal to the valleys of the threads, so that it will lie readily therein; but should the wire be of greater diameter than the valleys it may under some conditions be necessary to enlarge them to receive the locking member, as at 11, and this may readily be effected by means of a saw or an appropriately shaped file.

Instead of providing a bolt with two channels or grooves, as shown in Fig. 1, it may be provided with but a single channel 12, as shown in Fig. 4, and when this arrangement is employed the locking member will be disposed within the channel and will have one terminal 13 seated in the valley of the thread and the other terminal passed through the channel 5, thence around the teat 7, thence up through the channel 6, thence crossed over the intermediate portion of the locking member, as shown at 14, where it may be either cut off or twisted around it, as may be preferred.

It will be seen from the foregoing description that the improvements herein defined will require no extended change in the structural arrangement either in the nut or the bolt, such modifications as are adapted being readily applied to the parts at a cost that will not materially increase the cost of their production.

Having thus described the invention, what is claimed is—

1. In a nut-lock, a bolt having its threaded end provided with a channel or groove, and a nut provided at one corner with a lug or teat, in combination with a locking member looped around the teat and having a portion disposed in the channel and a terminal seated in the valley of the bolt-thread.

2. In a nut-lock, a bolt having its threaded end provided with intersecting channels or grooves, and a nut provided at one corner with a lug or teat, in combination with a locking member having its intermediate portion in engagement with the teat, its end portions disposed in the grooves or channels, and its terminals deflected and seated in the valleys of the threads.

3. In a nut-lock, a bolt provided at its threaded end with intersecting channels or grooves, and a nut provided at one corner with an undercut teat, in combination with a locking member having its intermediate portion in engagement with the teat, its end portions disposed within the channels or grooves, and its terminals seated in the valleys of the threads.

4. In a nut-lock, a bolt provided at its threaded end with intersecting channels disposed at right angles to each other, and a nut provided at one corner with intersecting grooves forming at their point of intersection an undercut teat, in combination with a locking member having its intermediate portion in engagement with the teat, and with the grooves, its end portions disposed in the channels of the bolt, and its terminals deflected laterally and seated in the valleys of the threads.

In testimony that I claim the foregoing as my own I have hereto affixed my signature in the presence of two witnesses.

JACOB T. SMITH.

Witnesses:
J. H. JOCHUM, Jr.,
A. G. SAIPP.